United States Patent Office 3,586,523
Patented June 22, 1971

3,586,523
CALCINED KAOLIN CLAY PIGMENT
John R. Fanselow, Plainfield, and Daniel A. Jacobs, Metuchen, N.J., assignors to Engelhard Minerals & Chemicals Corporation, Township of Woodbridge, N.J.
No Drawing. Filed Jan. 15, 1968, Ser. No. 697,581
Int. Cl. C08h 17/06; C09c 1/42
U.S. Cl. 106—288B
2 Claims

ABSTRACT OF THE DISCLOSURE

A finely divided, substantially anhydrous amorphous aluminum silicate obtained by calcining a specific type of kaolin clay, namely hard sedimentary kaolin clay, is used as a functional filler for newsprint or similar lightweight printed paper that is printed with low viscosity ink to reduce ink strike-through and to increase sheet brightness and opacity.

BACKGROUND OF THE INVENTION

It is the practice of the paper industry to fill certain paper, such as magazine stock, with substantial quantities of mineral matter such as refined kaolin clay. This is done to increase the opacity and brightness and the paper. Fillers also improve the printability of the sheet by increasing the smoothness, levelness and ink receptivity.

The manufacture of newsprint, however, differs substantially from the manufacture of magazine paper. In manufacturing newsprint, economic considerations rule out the use of certain materials that are normally employed in making magazine paper. Thus newsprint is made from inexpensive fiber and the large quantities of fillers used with other papers cannot be employed on a practical basis. Also, the paper is printed with low viscosity inks that are substantially different from the inks used in printing the more expensive papers.

As a result of these and other factors, the manufacture of newsprint or similar lightweight paper that is printed with low viscosity ink presents unique problems, one of the most significant of which is so-called "strike-through" or "show-through." This is a phenomenon whereby the printed matter applied to one face of the printed sheet is visible on the reverse side. Generally, it results from the fact that the vehicle of low viscosity inks has a tendency to penetrate or "strike-through" the sheet. This results in the formation of translucent areas in the sheet, reducing opacity, and causing the printing to be visible from the reverse side. The problem is especially severe when sufficient ink is employed to obtain a dark, distinct registration.

To reduce ink strike-through, some newsprint is filled with certain synthetic amorphous zeolites or synthetic hydrated silicas. The zeolites which are employed are obtained by precipitating oxides of sodium and aluminum in the presence of pre-precipitated silica. The zeolite and hydrated silica filler materials are considerably more expensive than mineral silicate fillers such as clay.

Calcined and uncalcined paper filling grades of kaolin clay of the type commonly used to load quality printing paper such as magazine stock are relatively ineffective in reducing ink strike-through in newsprint. Properties of typical filler grades of kaolin clay are described at page 383 of Grim's "Applied Clay Mineralogy," McGraw-Hill Book Company, Inc. (1962). Although kaolin fillers are very inexpensive as compared to the precipitated siliceous fillers, they have not been employed commercially as functional fillers for present-day newsprint or rotogravure sheets.

PRIOR ART

U.S. 3,277,607, "Method of Adding Silica Pigments to Newsprint Pulp to Improve Ink Strike Properties of the Newsprint and Pigment Therefor," Mays et al., issued Jan. 4, 1966, describes a group of finely divided, highly oil absorptive, synthetic spherical siliceous pigments and the use of such pigments as functional fillers for newsprint. By way of comparison, the patent includes data on the results of filling newsprint with hexagonal kaolin particles. The data confirm our findings that the kaolin filler was comparatively ineffective with respect to reducing ink strike-through and improving sheet brightness as compared to the synthetic precipitated siliceous fillers.

THE INVENTION

An object of the invention is to provide a novel inexpensive clay-derived aluminum silicate product adapted for use as a filler for newsprint or similar lightweight paper that is printed with low viscosity ink.

Another object is to provide filler loaded printed paper sheets with outstanding optical properties at low filler loadings.

This invention results from our discovery that a specific clay material, described hereinafter, is uniquely effective in decreasing ink strike-through and improving the sheet brightness and opacity of newsprint or similar lightweight paper. The novel processed clay material differs in kind from other clay products when present in small quantities in newsprint sheets or the like.

Stated briefly, the novel functional filler of the present invention is an amorphous, substantially anhydrous aluminum silicate obtained by calcining finely divided particles of a specific type of sedimentary kaolin clay, namely, hard clay. The novel functional filler may be incorporated with the fibers in the sheet before the sheet is printed with a low viscosity ink.

The resulting filled sheets are markedly improved with respect to brightness, opacity and reduction in ink strike-through as compared to unfilled sheets of similar fiber composition. The filled sheets are markedly superior to sheets filled with other kaolin products. Sheets filled with small quantities of calcined hard kaolin are generally comparable and sometimes superior to sheets which contain similar quantities of synthetic precipitated siliceous fillers. When employing calined hard kaolin, however, the desired improvement in the quality of the printed sheet is achieved at a fraction of the cost that is incurred when precipitated fillers are employed.

The type of clay which is processed to prepare the unique functional filler product of the invention is a form of kaolin heretofore used in raw (uncalcined) form as a filler by the rubber industry. The paper industry, in contrast, has utilizd raw or calcined soft clays and has made limited use of hard clays. When employed by the paper industry and the rubber industry, however, the hard clays have been used in uncalcined form. To the best of our knowledge, hard kaolins have never been calcined heretofore to produce filler or pigment products.

As mentioned, one essential feature of the invention is that the hard kaolin clay must be calcined before it is employed as a functional filler for newsprint or the like. It has been found that uncalcined (raw) hard kaolin clay is not significantly different from conventional kaolin filler clays (coarse size fractions of uncalcined soft kaolin clay) with regard to reducing ink strike-through. Uncalcined hard clay is markedly inferior to calcined hard clay in increasing sheet brightness and opacity and in reducing ink strike-through. Both uncalcined hard clays and uncalcined soft clays are inferior to the commercially used zeolite and precipitated silica fillers in these respects.

Still another feature of the functional filler product of the invention is that it has been obtained by calcining hard kaolin clay while the clay is in the form of a finely divided powder. Calcination of massive aggregates or coarse lumps of the hard clay will not suffice.

The effectiveness of calcined hard kaolin as a functional filler for newsprint was surprising and unexpected for many reasons.

In the first place, the selection of a material for use as an agent to reduce ink-strike would logically be directed to the choice of a white pigment having high surface area and the capacity to absorb large quantities of oil since news inks are employed as oily suspensions. U.S. 3,227,607 (supra) specifically teaches that the combination of high oil absorptivity, small particle size and high surface area of a filler contribute to the desired printing properties in newsprint. Calcined hard kaolin, however, has a very low surface area and poor oil absorption properties as compared to the synthetic precipitated siliceous pigments which have been demonstrated to be highly effective as functional newsprint fillers. Further, the ultimate particles of calcined hard kaolin are significantly larger than the submicron-size particles of prior art precipitated newsprint fillers. Therefore, the intrinsic properties of calcined hard kaolin would not reasonably suggest to one skilled in the art that calcined hard kaolin would have a remarkable effect on ink strike-through.

Moreover, the exceptional effect of calcined hard kaolin on sheet brightness and the superiority to calcined soft kaolin was not predictable. Hard kaolin crudes are generally significantly less bright than soft kaolins. In fact, hard kaolins are frequently referred to as "gray kaolin" by the paper industry. The reason why hard kaolins have heretofore found limited use by the paper industry is that raw, uncalcined hard kaolin clay does not possess the required brightness. See the Grim text (supra) at page 382. Contrary to expectations, calcined gray kaolin improved the brightness of representative newsprint sheets to a significantly greater extent that did various calcined kaolins in spite of the fact that latter kaolins had higher brightness values than the calcined hard kaolin.

DESCRIPTION OF THE INVENTION

Hard and soft kaolin clays are distinguished from each other in the Grim text (supra) at pages 394 to 398. Conventional papermaking kaolins are described in the same publication at pages 383 to 386. As mentioned in the Grim publication, hard kaolins are generally darker than soft kaolins, hard clays having brightness values of 71 to 78 percent and soft kaolins having brightness in the range of 74 to 82 percent. As noted above, hard kaolin clay is frequently referred to as "gray" clay since such clay normally has a distinct gray color.

Hard kaolin clays are also distinguished from soft kaolin clays by the fact that ultimate particles in hard kaolin clays are significantly finer than the particles in soft kaolins. The "ultimate" size is the size of the particles in a well-dispersed clay pulp. The fine size of the ultimate particles is responsible, at least in part, for the unusual mechanical strength of aggregates of raw hard clay, this giving rise to the term "hard" clay.

In a hard clay, substantially all (e.g., 90% by weight) of the particles are finer than 2 microns. See the Grim text (supra). About 60% by weight of the representative sample of hard kaolin described in the Grim text was finer than ½ micron. In other words, the average particle size of the hard clay was well below ½ micron. Soft kaolins, in contrast, contain a substantial amount of particles coarser than 2 microns. The plus 2 micron particles generally differ from the finer particles in that the former are composed of stacks or booklets of hexagonal clay crystals. The average particle size of a representative papermaking soft clay described by Grim was about 1 micron. Only a minor amount was finer than ½ micron.

Another difference is that hard kaolin clays tend to be less ordered (well crystallized) than soft kaolin clays. In other words, the soft kaolins produce more sharply defined X-ray diffraction peaks.

Still another difference between hard and soft clays, as shown in the Grim text, is that hard kaolin clay absorbs less water than soft kaolin clay.

Suitable hard kaolin clay crudes are sedimentary in origin. Such crudes are found, by way of example, in South Carolina and Georgia. The principal mineral constituent in the crudes is kaolinite, the particles of which are substantially all finer than 2 microns equivalent spherical diameter. Most hard crudes have a distinctly gray color.

In producing the calcined hard kaolin functional filler, the hard clay crude must be refined at least to the extent that coarse agglomerates and grit (plus 325 mesh residue) are removed. This may be done by wet or dry processing techniques. Dry processing of a clay crude is described by Grim at page 381. In wet processing, the clay is dispersed in water and degritted by means of screens or the like. Preferably, the wet-processed clay is hydraulically classified by sedimentation or centrifugation to remove virtually all particles larger than about 2 microns (equivalent spherical diameter).

The wet degritted slip of clay may undergo further refining such as flotation, as described for example in U.S. 2,990,958 to Greene et al., to remove colored titaniferous impurities from the clay. The hard clay may be chemically bleached with or without having undergone flotation beneficiation.

It is essential when calcining the clay to charge the calciner with dry, minus 200 mesh partiles of the hard clay since calcination of coarse lumps of the clay or a clay filter cake will not provide products having the desired properties. Wet or dry processed clays must therefore be pulverized to minus 200 mesh or finer before being calcined. Wet processed clays must undergo a drying step before the calcination in order to permit puverization. This may be accomplished by spray drying a dispersed slip of the wet processed hard clay and pulverizing the spray dried microspheres. Ammonium hydroxide is a preferred dispersant when the clay is dried by spraying since such dispersant does not introduce salts which might flux the clap particles during the calcination.

A preferred method for calcining the clay is by continuous rotary calcination with a shielded flame, as described in Ser. No. 514,457, filed Dec. 17, 1965 by Allegrini et al., now U.S. 3,383,438.

It is also possible to calcine the clay in a multihearth furnace or in a muffle furnace.

During calcination, the temperature of the clay particles should be within the range of about 1600 to 2300° F. Residence time will vary considerably with the calcination equipment that is used but should be sufficient to dehydrate the clay substantially completely without forming high temperature crystalline phases. During calcination the clay undergoes an abrupt endothermic reaction associated with loss of water of hydration. After the clay passes through the endotherm it undergoes an exothermic reaction at about 1800° F. We prefer to employ hard clay which has been calcined under conditions of temperature and time such that the clay undergoes the exotherm after dehydration has taken place. Such clay is brighter than clay calcined under moderate conditions and generally results in a brighter filled sheet. Calcined hard kaolin that has undergone the exotherm also is more effective in reducing ink strike-through than calcined hard kaolin that has not passed through the exotherm.

The calcined hard clay should have a volatile matter content below about 1% by weight. The term "volatile matter" refers to the weight percent of a material that is eliminated when the material is heated to essentially constant weight at 1800° F.

Since powdered kaolin clay tends to agglomerate into soft friable small balls during calcination, especially when the calcination is carried out in a rotary calciner, the calcined clay must be repulverized to minus 200 or 325 mesh (Tyler) before use as a newsprint filler. Thus, in producing the newsprint filler pigment, degritted hard clay must be pulverized, calcined and then repulverized.

Calcination effects many changes in the hard clay. Originally, the clay is a hydrated aluminum silicate having a volatile matter of about 13% to 14% by weight. The original clay is a crystalline material and an X-ray pattern of the material has a well-defined peak characteristic of the crystalline mineral. In contrast, the calcined clay is substantially anhydrous and it is amorphous in the sense that an X-ray diffraction pattern of the material does not contain well-defined peaks. As another difference, the ultimate particles of the calcined hard clay are coarser than the particles of the raw hard clay precursor. Thus, a hard clay which has an average size of about 0.3 micron before calcination may have an average size of about 0.8 micron after calcination.

Calcination also increased block brightness of the clay. A wet-processed flotation beneficiated, chemically bleached hard clay having a brightness of 89% to 91% before calcination may have a brightness of about 90% to 94% after calcination. All brightness values of minerals and fillers as used herein refer to block brightness values as determined in accordance with the TAPPI procedure with a G.E. reflectance meter using light having a wavelength of about 457 m$\mu$.

In spite of the fact that calcined hard kaolin has remarkable ink strike-through, opacifying and brightening properties, such material would be of limited practical use as a filler for newsprint or similar lightweight paper stock if the calcined clay were highly abrasive. A very abrasive calcined clay would result in excessive Fourdrinier wire-wear during the paper forming step. A unique characteristic of hard kaolins that was discovered in carrying out the experimental work that led to the development of the instant invention is that calcination of powdered hard clay may result in products of remarkably low abrasiveness. As measured by the well-known Valley abrasion test method, calcined powdered hard clays may have abrasion values below 50 mg. Calcination of powdered soft kaolin clays under comparable conditions produces much more abrasive products, e.g., products having Valley abrasion values above 100, usually above 300.

Following is a summary of typical physical properties of representative samples of calcined hard kaolin.

| | Product of invention |
|---|---|
| Oil absorption (ASTM) g./100 g. | 60–90. |
| Oil absorption (Gardner-Coleman) g./100 g. | 110–130. |
| +325 mesh residue, wt. percent | Less than 1. |
| Brightness, percent (TAPPI) | 92–95. |
| Valley abrasion [1], mg. | 20–50. |
| Surface area (B.E.T.), m.$^2$/g. | 0.6–0.8. |
| Average particle size, e.s.d. | 10–20. |

[1] Test described in U.S. 3,014,836 to Proctor.

The calcined hard kaolin pigment may be used alone or in any desired proportion with other fillers, such as the zeolite or hydrated silica fillers of U.S. 3,227,607, or the specially processed attapulgite clay fillers described in Ser. No. 524,987, filed Dec. 16, 1965) by Hecklau et al., now U.S. Pat. No. 3,433,704.

The calcined hard kaolin filler is employed in amount to provide a finished sheet containing about 1% to 10% filler based on the sheet weight, on a moisture-free (dry) filler weight. Moisture-free filler weight refers to the weight of the filler after being dried to essentially constant weight at about 220° F. The calcined hard clay is especially effective when used in about as low as about 2% of the dry paper weight.

The calcined hard kaolin is adapted to be used as a filler for low basic weight paper, i.e., paper having a weight of about 26 to 40 pounds per ream (24" x 36"=500 sheets). Filled newsprint usually has a weight of about 32 pounds per ream. Newsprint finish usually contains at least about 60% ground wood pulp, most frequently about 60% to 85% ground wood, and the balance long fiber chemical pulp. The calcined hard clay is not limited in use to the filling of paper made up largely with ground wood pulp since it may be employed with long fiber pulp such as the pulp used to prepare bible paper.

In producing the filled paper, the pulverized hard clay may be incorporated with agitation into the wet paper furnish before the stock enters the headbox or while the stock is in the headbox. Alternatively, the paper may be filled with the calcined hard clay by the spraying technique suggested for use with synthetic precipitated siliceous newsprint fillers.

The low viscosity inks that are employed for printing the filled lightweight, porous papers include news inks and rotogravure inks. The vehicle of news inks consists almost exclusively of light-colored mineral oil. This type of ink dries by absorption of the vehicle. Rotogravure inks are prepared with a vehicle of a petroleum solvent and a resin binder. Gravure inks dry by evaporation of the solvent.

EXAMPLE

Preparation of calcined hard kaolin filler powder

A sample of hard gray kaolin from the Prim property near McIntyre Ga., was crushed, dispersed in water and degritted over a 325 mesh screen. The brightness of the minus 325 mesh clay was about 78%. The degritted hard clay was fractionated to about 98% minus 2 microns, beneficiated by froth flotation and bleached by treatment with potassium permanganate and zinc hydrosulfite as described in U.S. 3,353,668 to James B. Duke.

The filter cake from the bleaching vats contained about 60% solids and was fluidized by adding a small amount of ammonium hydroxide. The dispersed slip was spray dried with an 1080° F. inlet temperature, a 255–265° F. outlet temperature and a 24,000 r.p.m. spray wheel speed. The spray dried product was pulverized in a micropulverizer through a 0.020" screen. The pulverized clay was then calcined on a continuous basis in an indirectly fired rotary kiln as described in U.S. 3,383,438 to Allegrini et al. Inlet temperature of the gas in the kiln was within the range of about 2200° F. to 2300° F. Outlet temperatures were within the range of 1150°–1205° F. during the calcination. After the calcined hard kaolin was cooled, it was pulverized in a micropulverizer with a 0.02" screen.

The calcined product had a loss on ignition (at 1800° F.) of 0.77% by weight and analyzed about 45% by weight $Al_2O_3$ and 53% $SiO_2$. Gardner-Coleman oil absorption value was 123 g. oil/100 g. ASTM oil absorption value was 76 g./100 g. Surface area (B.E.T.) was 15.2 m.²/g. The block brightness of the clay as determined with a G.E. meter by the TAPPI method was 93.5%.

The product had a plus 325 mesh residue of 0.42% by weight. A particle size distribution curve of the product was obtained from sedimentation data. From the sedimentation data, the particle size distribution was calculated by application of Stokes' law using 2.58 g./ml. as the apparent density for the clay. A particle size distribution curve was drawn. From the curve, it was estimated that the ultimate particles in the calcined hard clay were 100% by weight finer than 4.5 microns; 98% finer than 3.4 microns; 85% finer than 1.7 microns; 70% minus 1.3 microns; 50% minus 0.8 micron; 28% minus 0.57 micron; 10% minus 0.40 micron and 3% minus 0.28 micron.

Preparation of filled newsprint sheets

The calcined hard kaolin product was used to fill newsprint sheets. For purposes of comparison a variety of other kaolin products, including uncalcined and calcined kaolins, were used to fill similar handsheets. For further purposes of comparison, some newsprint sheets were prepared without any filler. Other sheets were prepared with commercially used precipitated siliceous fillers.

The fillers tested for purpose of comparison are as follows:

"Zeolex® 23P"—a precipitated, spherical, hydrated sodium aluminosilicate zeolite pigment; this pigment is used commercially as a filler for newsprint.

"Hi Sil® 404"—a functional, hydrated silica pigment.

Uncalcined hard clay—a sample of floated, bleached pulverized, spray-dried hard clay which was not calcined.

"Stellar"—uncalcined, fine fraction of bleached, Georgia soft kaolin clay having an average particle size of about 0.6 micron; commercially used as paper coating pigment.

"No-Karb"—uncalcined, coarse size fraction of bleached Georgia soft kaolin clay having an average particle size of about 5 microns; commercially used as a filler clay for magazine paper, etc.

"HT"—similar to Stellar but having an average size of about 0.8 micron.

All calcined clays were pulverized in a mill with a 0.02" screen before and after calcination and were calcined under conditions similar to those described above in connection with the calcination treatment of the hard kaolin.

The pulp that was used to make news handsheets consisted of ⅔ ground wood fibers and ⅓ semibleached kraft pine fibers. The handsheets were made up with 2.50 ± 0.10 grams air dried pulp per sheet (37 lu./3000 sq. ft. ream). All the sheets were made from a master batch of fiber which was refined to a Schopper-Riegler freeness of about 35. All handsheets wer made using a Nobel & Wood laboratory handsheet machine and equipment. Test fillers were added in the form of aqueous dispersions of 12.5 percent weight concentration in amounts within the range of 1 to 10% of the dry sheet weight, calculated on an oven-dry filler weight basis. Following the addition of the slurry of filler, a 20% alum solution was added in amount of 4 cc. per sheet. The alum solution contanied sulfuric acid in amount to provide a pH of 4.8 ± 0.2 per 10 liters of deionized water in the headbox. Sets of fifteen sheets each were prepared at each level of each mineral addition at the 37 lbs. basis weight level.

The handsheets were calendered on a supercalendar with one pass at 500 lb. per linear inch, followed by a second pass at 1000 lb. per linear inch to simulate the action of paper machine calenders.

Sheet brightnes was measured on the G.E. brightness meter and sheet opacity (contrast ratio) measurements were made on a Bausch and Lomb opacimeter following standard TAPPI procedure.

Printing was done on a Vandercook No. 4 Proof Press with IPI newsprint ink number NX–2595 at eight different levels of printing blackness ranging between 79 and 94 and at 10 mils impression. Blackness is defined as 100 minus the ratio (expressed as a percent) of the reflectance of the surface of a solid print to the reflectance of the unprinted paper while both are backed with a pile of similar unprinted sheets. The blackness was maintained at any one level with ± 1.0 units of the desired value throughout a series of 96 sheets (one from each set). This was accomplished by small additions of ink between each four to six sheets printed. Blackness was calculated from reflectance readings taken on the Bausch and Lomb opacimeter immediately after each impression.

The printed sheets were conditioned in a constant temperature and humidity room (temperature 72° F. and humidity 50 percent) for a period of 24 ± 3 hours before determining ink strike-through. Strike-through is defined as 100 minus the ratio (expressed as a percent) of reflectance of the back of the printed area to the reflectance of the unprinted sheet while both are backed by a black body. This was calculated from reflectance readings taken on the Bausch and Lomb opacimeter.

From the data obtained with the printed sheets, graphs were made plotting strike-through versus print blackness. This was done for each filler for each level of filler content. From the graphs, the values of strike-through at a blackness level of 90.0 percent were obtained. A second series of graphs were made plotting the values of strike-through at the 90.0 percent blackness level versus percentage filler content.

From the observed values of sheet brightness at each filler loading and the observed brightness value of the unfilled sheet, the increase in brightness was calculated for each filler loading. Values for "Zeolex 23P" and calcined hard clay appear in Table I. By dividing this calculated value by the weight percent of filler for each filler loading, the increase in brightness per percent filler loading was calculated. These values were averaged for the various fillers. Results for "Zeolex 23P" and calcined hard kaolin also appear in Table I. As shown in the table, the calculated average increases in brightness per percent of filler was 0.7 for "Zeolex 23P." The value for the product of the invention, calcined hard clay, was 1.1.

To provide a quantitative basis for comparing the performance of various fillers with the effectiveness of the 93% brightness "Zeolex 23P" as the standard, the average increase in sheet brightness per percent of "Zeolex 23P" was assigned an index value of 1.00. Corresponding index values for the other fillers were obtained by dividing the average brightness increase per percent filler loading by the value for "Zeolex 23P" to establish the relative effectiveness of the two fillers. A value for a filler greater than 1.0 indicates that the material is more effective than "Zeolex 23P." If the value is less than 1.0, this indicates that the material is less effective.

By way of illustration, when the effect per percent of "Zeolex 23P" on brightness was 0.7 and the effect per percent of the calcined hard clay was 1.1 the relative brightness index for hard clay would be 1.1/0.7 or 1.6.

In similar manner, the various fillers were rated for their effect on reducing ink strike-through per percent of filler by dividing the observed strike-through values for each filler by the amount of filler, averaging the results, and assigning the average absolute result for "Zeolex 23P" an ink strike-through reduction index value of 1.0. Values for "Zeolex 23P" and calcined hard kaolin appear in Table I for illustrative purposes. Opacity index values were obtained in the same manner and reported in Table I.

Brightness increase and strike-through reduction index values for various fillers, including the fillers employed in obtaining the results in Table I, appear in Table II.

TABLE I.—EFFECT OF CERTAIN FILLERS ON INK STRIKE-THROUGH, SHEET BRIGHTNESS AND OPACITY OF NEWSPRINT

| Filler, wt. percent | Reduction in ink strike-through | | Increase in paper brightness [1] | | Increase in paper opacity at common sheet weight | |
|---|---|---|---|---|---|---|
| | Observed | Increase over fiber per percent of filler | Observed | Increase over fiber per percent of filler | Observed | Increase per percent of filler |
| "Zeolex 23P": | | | | | | |
| 0.8 | 0.6 | 0.8 | 1.0 | 1.2 | | |
| 1.85 | 4.2 | 2.3 | 1.4 | 0.6 | | |
| 3.86 | 6.5 | 1.7 | 2.4 | 0.6 | 1.8 | 0.5 |
| 4.15 | 10.9 | 2.6 | 2.5 | 0.6 | 2.1 | 0.5 |
| 4.55 | 10.0 | 2.2 | 3.2 | 0.7 | 4.3 | 0.9 |
| 5.10 | 11.1 | 2.2 | 3.2 | 0.7 | 2.5 | 0.5 |
| Average | | 1.9 | | 0.7 | | 0.6 |
| Index (assigned) | | 1.0 | | 1.0 | | 1.0 |
| Product of invention: | | | | | | |
| 0.88 | 1.5 | 1.7 | 1.1 | 1.2 | 0.7 | 0.8 |
| 1.50 | 5.3 | 3.5 | 2.0 | 1.3 | 2.4 | 1.6 |
| 2.32 | 4.9 | 2.1 | 2.6 | 1.1 | 3.6 | 1.5 |
| 2.64 | 6.0 | 2.3 | 3.3 | 1.2 | 4.1 | 1.6 |
| 3.65 | 7.2 | 2.0 | 3.2 | 0.9 | 5.0 | 1.4 |
| 3.67 | 6.4 | 1.7 | 3.2 | 0.9 | 3.6 | 1.0 |
| Average | | 2.2 | | 1.1 | | 1.3 |
| Index (calculated) | | 1.2 | | 1.6 | | 2.1 |

[1] Unfilled sheet brightness=63±1.

TABLE II.—SUMMARY OF EFFECT OF FILLERS ON INK STRIKE-THROUGH AND SHEET BRIGHTNESS OF NEWSPRINT SHEETS

| Filler | Increase in sheet brightness, index [1] | Reduction in ink strike-through, index [2] |
|---|---|---|
| Commercial fillers: | | |
| "Zeolex 23P" | 1.0 | 1.0 |
| "Hi Sil 404" | 1.3 | 1.1 |
| Kaolin clay products: | | |
| (1) Calcined kaolins | | |
| Product of invention (calcined hard kaolin) | 1.6 | 1.2 |
| Calcined "Stellar" | 1.3 | 0.5 |
| Calcined "HT" | 1.1 | 0.5 |
| Calcined mechanically delaminated kaolin | 1.0 | 0.4 |
| Calcined "NoKarb" | 0.4 | 0.2 |
| (2) Uncalcined kaolins: | | |
| Hard kaolin | 0.8 | 0.3 |
| "Stellar" | 0.7 | 0.1 |
| "HT" | 0.7 | 0.1 |
| "NoKarb" | 0.3 | 0.2 |

[1] Sheet brightness of unfilled paper=63±3%.
[2] Change (±0.1) per percent of filler as compared to change per percent of "Zeolex 23P."

Observed data in Table I for the fillers show that the commercial filler and the product of the invention increased sheet brightness and opacity and decreased strike-through when used in amounts within the range of about 1% to 9% of the sheet weight. The data in Table I show that for both fillers the increases in brightness and opacity and the reduction in ink strike-through were related to the amount of filler used. The effects per unit of filler on brightness and opacity increase and reduction of strike-through were generally greater with the product of the invention.

As mentioned, data in Table II summarize the performance of a variety of clay products and commercially used newsprint fillers. Data in Table II show that the product of the invention was the only kaolin product which was comparable to the commercial newsprint fillers in reducing strike-through. The other clay products, including various calcined kaolins, were markedly inferior to the product of the invention and to the commercially used fillers in this respect. Thus, whereas the product of the invention and the commercial fillers had strike-through reduction index values of at least 1.0, the best clay product outside the scope of the invention (calcined "Stellar," a soft clay) had an strike-through reduction index value of only 0.5. In effect, a given weight of the product of the invention or of the commercial fillers would be expected to be at least twice as effective in reducing ink strike-through as the calcined soft clay.

Index values for the uncalcined clays show that all were quite ineffective in reducing strike-through and that, with the exception of hard clay, calcination did not result in products comparable to the commercial newsprint filler in strike-through reduction properties. The data show that in spite of the fact that the uncalcined hard clay was only about one-third as effective as "Zeolex 23P" the calcined hard clay was 20 percent more effective than the "Zeolex 23P."

Sheet brightness data in Table II show that the product of the invention was superior to the commercial newsprint fillers in improving brightness of the 63 percent brightness newsprint sheet. In contrast, before calcination, the hard kaolin was inferior to the commercial fillers. It was surprising that the product of the invention was superior to the commercial fillers in improving sheet brightness since the block brightness of the calcined kaolin clay (93%) was similar to that of "Zeolex 23P" and appreciably less than the 96 percent brightness of "Hi Sil 404."

The brightness data in Table II show also that calcined kaolins as a class were not comparable to the commercial fillers in their effect on brightness although the "Stellar" and "HT" clays were improved substantially by calcination. It was pointed out about, however, that the latter calcined clays were comparatively ineffective in reducing ink strike-through.

Thus, of the various kaolin products, only the product of the invention performed as well as a newsprint filler as the synthetic precipitated fillers.

We claim:

1. A substantially white anhydrous amorphous hard kaolin clay pigment, said pigment being composed of particles substantially all of which are finer than 5 microns and at least 50 percent by weight of which are finer than 1 micron, said pigment having an ASTM oil absorption value within the range of about 60 to 100 g./100 g., a Valley abrasion value below 50 mg., and a B.E.T. surface area within the range of 10 to 20 m.²/g., the pigment containing less than 1 percent by weight of particles coarser than 325 mesh.

2. The pigment of claim 1 which has a G.E. brightness within the range of 92 percent to 95 percent.

References Cited

UNITED STATES PATENTS

| | | | |
|---|---|---|---|
| 3,014,836 | 12/1961 | Proctor | 106—288I |
| 3,227,607 | 1/1966 | Mays et al. | 106—72 |
| 3,353,668 | 11/1967 | Duke | 106—72 |
| 3,383,438 | 5/1968 | Allegrini et al. | 106—288I |

JAMES E. POER, Primary Examiner

U.S. Cl. X.R.

106—72; 23—110

UNITED STATES PATENT OFFICE
CERTIFICATE OF CORRECTION

Patent No. 3,586,523          Dated June 22, 1971

Inventor(s) John R. Fanselow et al.

It is certified that error appears in the above-identified patent and that said Letters Patent are hereby corrected as shown below:

Column 2, line 61, "utilizd" should read -- utilized --. Column 5, line 73, "0.6-0.8" should read -- 10-20 --; line 74, "10-20" should read -- 0.6-0.8 --. Column 7, line 51, "(37 lu./3000 sq. ft." should read -- (37 lb./3000 sq. ft. --; line 55, "wer" should read -- were --; line 62, "contanied" should read -- contained --. Column 8, line 30, "blacknes" should read -- blackness --. Column 9, line 29, "throngh" should read -- through --; line 36, "Prodnct" should read -- Product --.

Signed and sealed this 23rd day of May 1972.

(SEAL)
Attest:

EDWARD M. FLETCHER, JR.
Attesting Officer

ROBERT GOTTSCHALK
Commissioner of Patents